(12) United States Patent
Liao (10) Patent No.: US 7,786,692 B2
(45) Date of Patent: Aug. 31, 2010

(54) SIGNAL TRANSMISSION APPARATUS OF A DC BRUSHLESS MOTOR FOR A CEILING FAN

(75) Inventor: Yin Sheng Liao, Taichung (TW)

(73) Assignee: Rhine Electronic Co., Ltd., Taichung County (TW)

( * ) Notice: Subject to any disclaimer, the term of this patent is extended or adjusted under 35 U.S.C. 154(b) by 461 days.

(21) Appl. No.: 11/771,544

(22) Filed: Jun. 29, 2007

(65) Prior Publication Data

US 2009/0004010 A1    Jan. 1, 2009

(30) Foreign Application Priority Data

Jun. 4, 2007    (CN) .................. 2007 1 0109643

(51) Int. Cl.
*H02P 1/46* (2006.01)

(52) U.S. Cl. .................. 318/700; 318/714; 318/713

(58) Field of Classification Search .................. 388/800, 388/907, 907.5; 318/700, 714, 713
See application file for complete search history.

(56) References Cited

U.S. PATENT DOCUMENTS

2001/0001228 A1 * 5/2001 Huang et al. .................. 326/30

* cited by examiner

*Primary Examiner*—Karen Masih
(74) *Attorney, Agent, or Firm*—Holland & Knight LLP; Brian J. Colandreo, Esq.

(57) ABSTRACT

A signal transmission apparatus of a DC brushless motor for a ceiling fan is provided. The signal transmission apparatus comprises a transmitting line. The transmitting line is configured to transmit processed output signals of a plurality of electromagnetic sensors, in which usage of transmission lines is reduced. The output signals of the electromagnetic sensors represent the operation of the magnetic poles of the DC brushless motor.

12 Claims, 7 Drawing Sheets

SIGNAL TRANSMISSION APPARATUS OF A DC BRUSHLESS MOTOR FOR A CEILING FAN

RELATED APPLICATION(S)

This application claims the benefit of priority based on Chinese Patent Application Serial No. 200710109643.X, filed 4 Jun. 2007, the contents of which are herein incorporated by reference.

BACKGROUND OF THE INVENTION

1. Field of the Invention

The present invention relates to a signal transmission apparatus of a DC brushless motor. More particularly, the present invention relates to a signal transmission apparatus used in a DC brushless motor of a ceiling fan for transmitting at least one processed output signal from at least one sensor, wherein the output signal represents a variation of the magnetic pole operations in the DC brushless motor.

2. Descriptions of the Related Art

DC brushless motors have several advantages, such as a high torque at low speeds and low electromagnetic interference. In addition, they are free of noise and carbon brush maintenance. However, to successfully start and maintain smooth operation of a DC brushless motor from its stationary state, the sensors (e.g., Hall sensor) have to be mounted in the motor to sense the variation of the magnetic fields from the rotation of the magnets. The motor control signal can then be generated to ensure continuous and steady operation of the motor.

Figure 1:
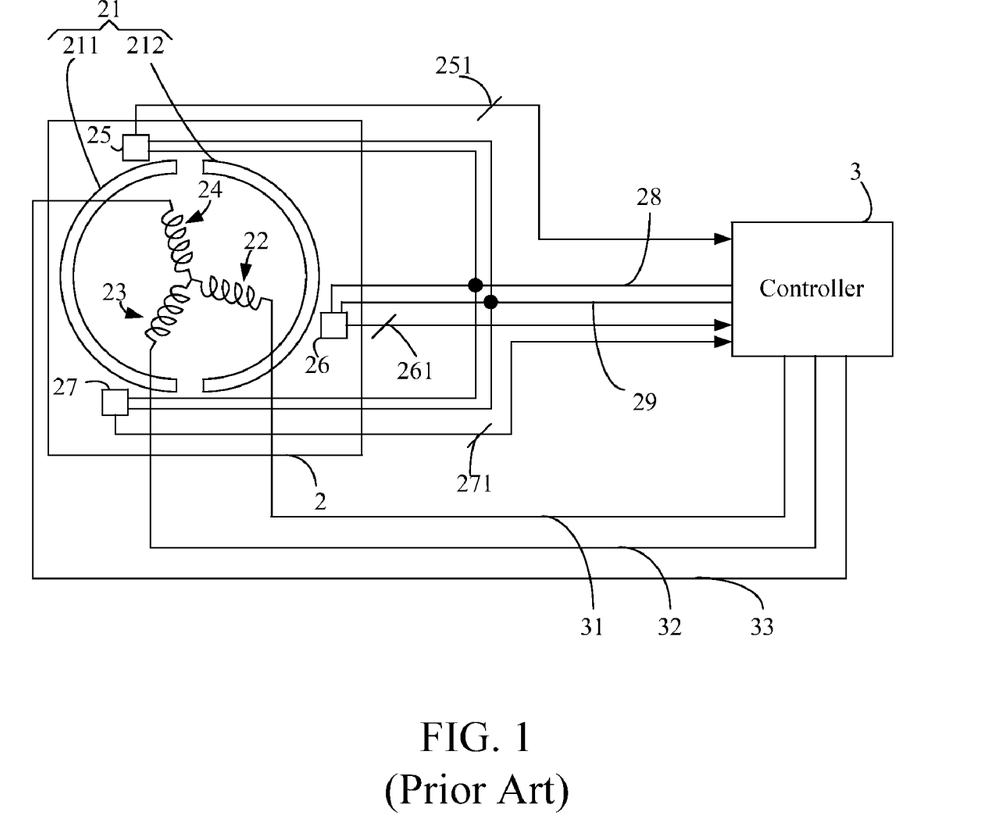
FIG. 1 is a circuit block diagram of a conventional DC brushless motor and a controller.
Figure 2:
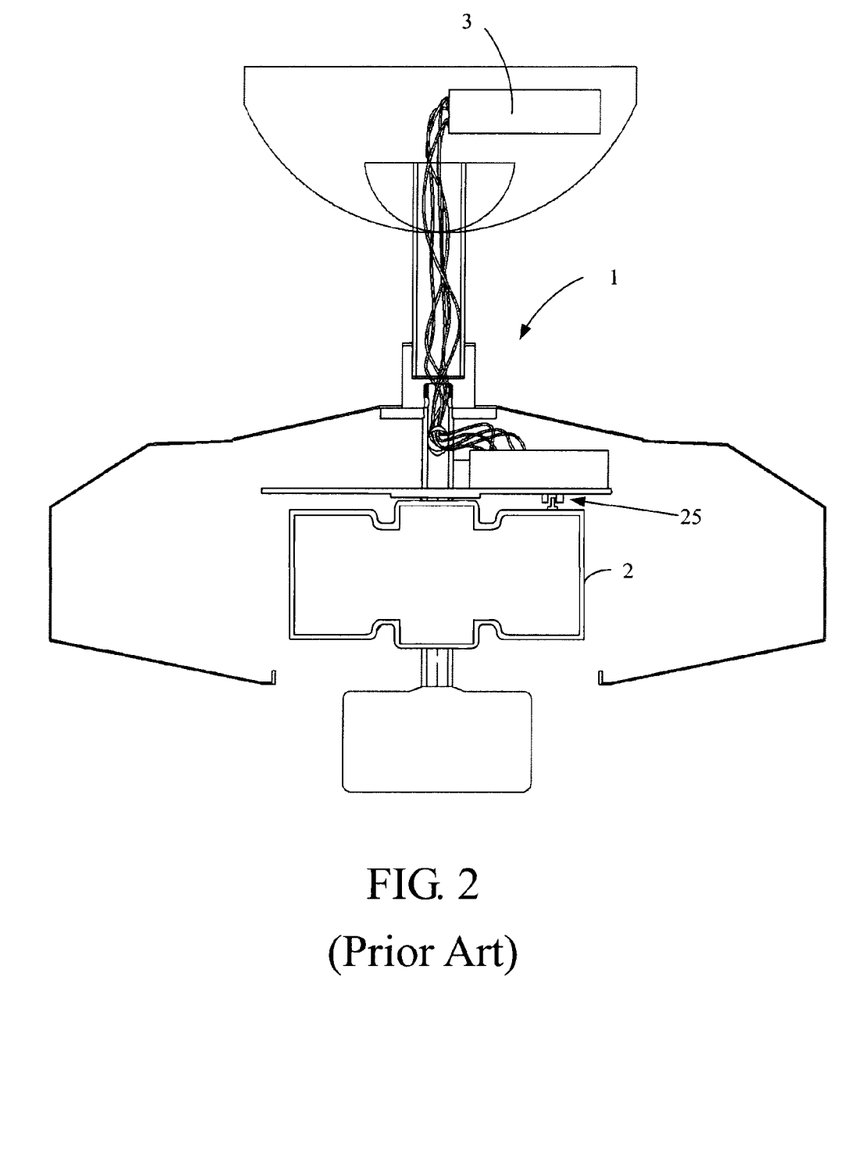
FIG. 2 is a schematic view of the connection between the conventional DC brushless motor and the controller.

For example, in a three-phase DC brushless motor, three sensors and a permanent magnet are required. FIG. 1 illustrates a circuit block diagram of a DC brushless motor 2 and a controller 3 in a ceiling fan (not shown). The DC brushless motor 2 comprises a magnet 21 with two magnetic poles 211 and 212, three excitation coils 22, 23 and 24, and three sensors 25, 26 and 27. The controller 3 is connected to the excitation coils 22, 23 and 24, respectively, through the coil-energizing lines 31, 32 and 33, to control the operation of the DC brushless motor 2. It can be seen from FIG. 1 that at least five transmission lines are needed between the motor and the controller to (1) transmit the three sensing signals 251, 261 and 271 through the respective lines, (2) power the sensor through the transmission line 28 and (3) supply a reference voltage level through the reference voltage level line 29. FIG. 2 illustrates a schematic view of the connection between the DC brushless motor 2 and a controller 3 in a ceiling fan 1, in which the sensors (only one sensor 25 is illustrated here as an example) are located outside of the DC brushless motor 2. The sensing signals are transmitted to the controller 3 via five transmission lines.

Drilling is required to route the transmission lines between the motor and the controller. However, this is an invasive process that often ends in hardware damage. For example, to mount the three-phase DC brushless motor to the ceiling fan, large connecting holes have to be drilled into the motor axis so that the transmission lines can pass therethrough and connect to the controller. These large connecting holes may degrade the durability of the motor axis, and consequently, place the user at risk for injury after a long period of service.

SUMMARY OF THE INVENTION

One objective of this invention is to provide a signal transmission apparatus of a DC brushless motor for a ceiling fan, in which the output signal from a sensor is transmitted to a controller via one transmission line. As a result, the number of connecting lines is reduced from five to two. The two connecting lines are the transmission line and reference voltage level line. In this way, the eventual degradation of the motor axis due to excessively large connecting holes is prevented.

Through the combination of a plurality of output signals from the respective sensors in this invention, the output signals can be transmitted from the sensors mounted in the motor to a controller through just one transmission line. Thus, the number of transmission lines is reduced without affecting the data of such output signals, and therefore. Usage of line materials can be reduced effectively.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The main concept of this invention is to achieve signal transmission in a DC brushless motor of a ceiling fan using a sequenced signal transmission technology. The following descriptions will be made in reference to the preferred embodiment.

Figure 3:
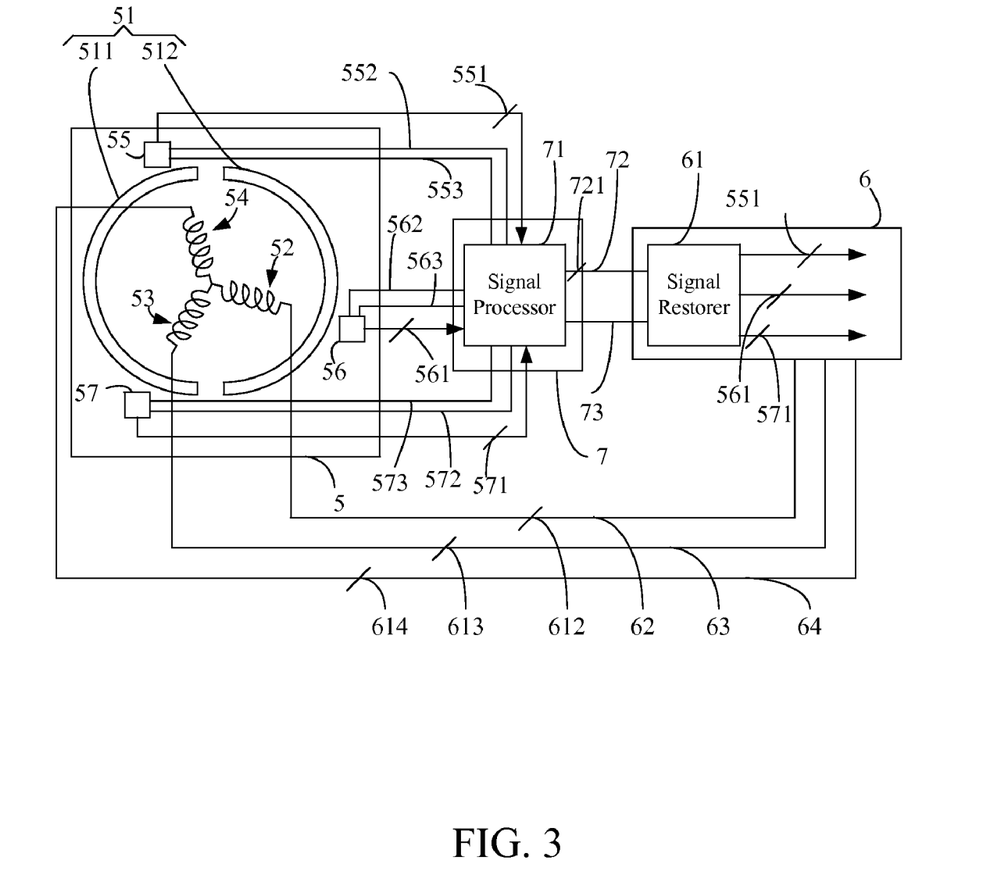
FIG. 3 is a schematic view of the preferred embodiment of this invention.

FIG. 3 illustrates a DC brushless motor 5, a controller 6 and a signal transmission apparatus 7 in a ceiling fan (not shown). The DC brushless motor 5 comprises a magnet 51 with two magnetic poles 511 and 512, three excitation coils 52, 53 and 54, and three sensors 55, 56 and 57. In this embodiment, the sensors are Hall sensors, however, the sensors can be any sensors being able to detect the magnetic pole operations in the DC brushless motor. The controller 6 comprises a signal restorer 61 and three coil-energizing lines 62, 63 and 64 electrically connected to the excitation coils 52, 53 and 54 respectively. The signal transmission apparatus 7 comprises a signal processor 71, a transmission line 72 and a reference voltage level line 73 for supplying the reference voltage level. The signal transmission apparatus 7 is configured to electrically connect the DC brushless motor 5 with the controller 6 so that the output signals from the sensors 55, 56 and 57 can be transmitted to the controller 6 via the signal transmission apparatus 7. In the other embodiments, the DC brushless motor may also comprise a plurality of magnets and/or a plurality of magnetic poles. The DC brushless motor may also only have one sensor. The sensors used in this embodiment are intended for illustration and not as a limitation of the present invention. An example of another sensor could be an infrared ray breaker.

The sensors 55, 56 and 57 are configured to sense the variation of the magnetic fields as a function of the relative angles of the magnet 51 with respect to the excitation coils 52, 53 and 54, and to generate the output signals 551, 561 and 571 respectively. The output signals 551, 561 and 571 are transmitted to the signal processor 71 of the signal transmission apparatus 7. The output signals 551, 561 and 571 represent the variation of the rotating magnetic poles in the DC brushless motor 5. The signal processor 71 supplies power to the sensor 55 via a coil-energizing line 552, and also supplies a reference voltage level via a reference voltage level line 553. Similarly, the signal processor 71 is not only electrically connected to the sensor 56 via the coil-energizing line 562 and reference voltage level line 563, but also electrically connected to the sensor 57 via the coil-energizing line 572 and reference voltage level line 573.

Upon receiving the output signals 551, 561 and 571, the signal processor 71 processes these output signals into a sequenced signal 721, so that the processed output signals can be transmitted collectively through the single transmission line 72. The sequenced signal 721 is transmitted via the transmission line 72 to the signal restorer 61, which restores the sequenced signal 721 back into the output signals 551, 561 and 571 for use by the controller 6 in operating the DC brushless motor 5. In detail, based on the restored output signals 551, 561 and 571 received from the signal restorer 61, the controller 6 executes a sequence of power adjustment procedures and generates power signals 612, 613 and 614 to the excitation coils 52, 53 and 54 of the motor 5, respectively, through the coil-energizing lines 62, 63 and 64, thereby, controlling the operation of the DC brushless motor 5.

Figure 4:
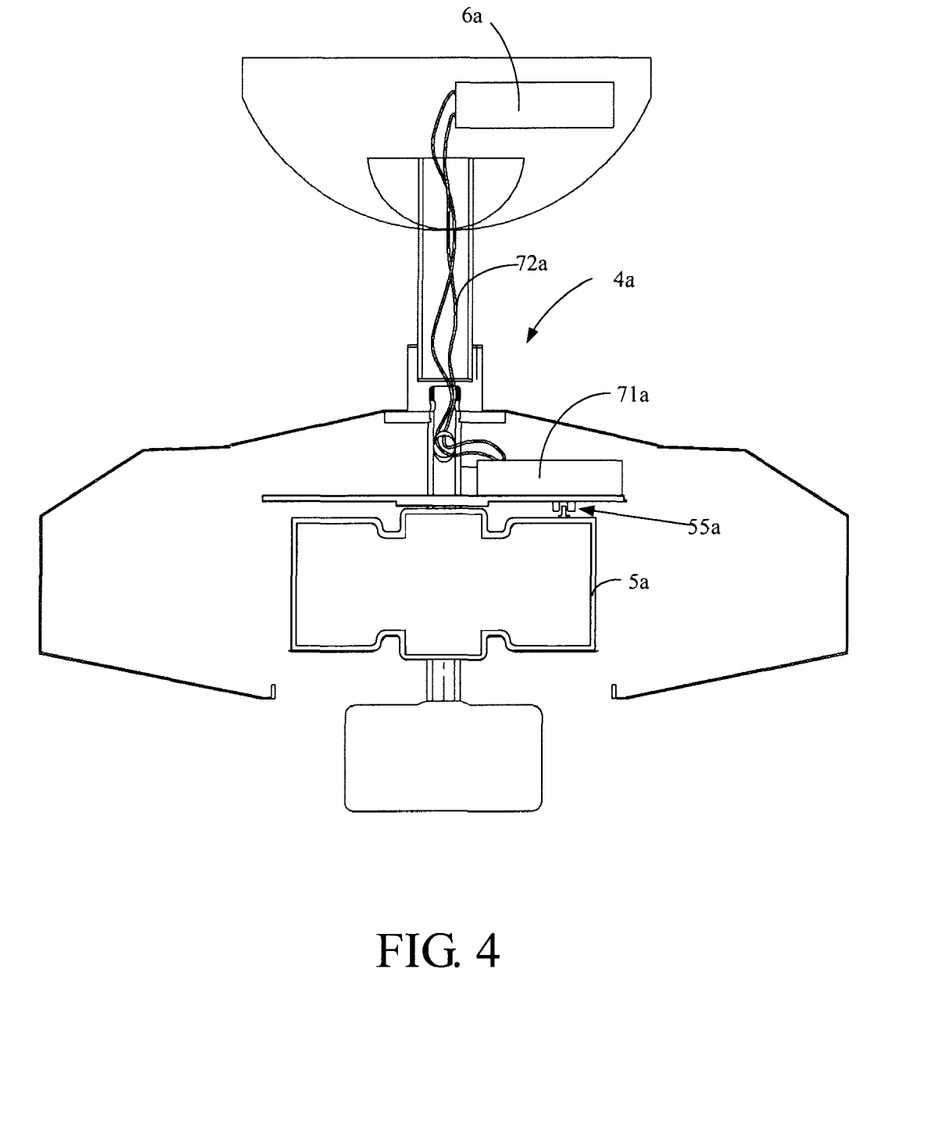
FIG. 4 is a schematic view of the connection between the DC brushless motor and the controller in the preferred embodiment.

FIG. 4, it illustrates a schematic view of the connection between the DC brushless motor 5*a* and controller 6*a* in a ceiling fan 4*a*. This embodiment differs from the above embodiment in that the sensors (only one sensor 55*a* is shown here for clarity) are located outside the DC brushless motor 5*a* and the signal processor 71 transmits the output signals of the sensors via a transmission line 73 to the controller 6*a*. The sensors in this embodiment are infrared ray breakers.

Figure 5:
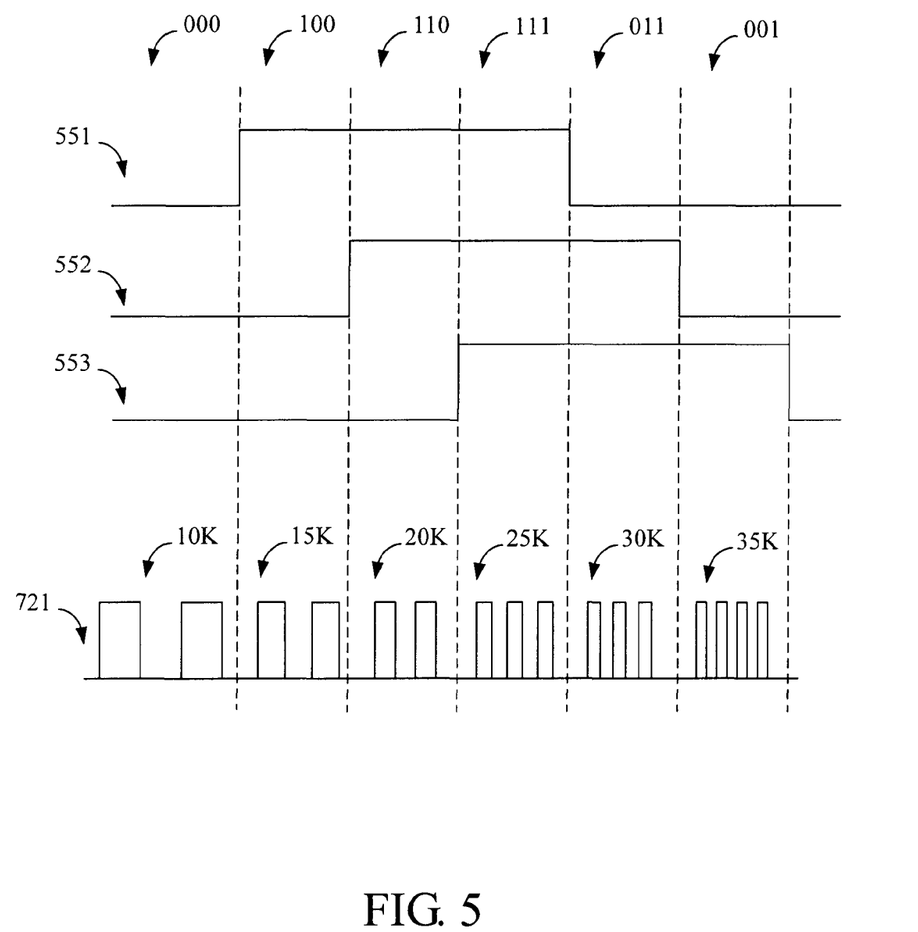
FIG. 5 is a schematic view of waveforms of output signals and a sequenced signal in the preferred embodiment.

FIG. 5 illustrates schematic waveforms of the output signals 551, 561 and 571 and the sequenced signal 721 in the above embodiment. In this embodiment, the output signals 551, 561 and 571 of the sensors 55, 56 and 57 are three square-wave signals with phase differences with respect to each other. Each of the square-wave signals can represent a digital signal '0' or '1'. In other words, the output signals 551, 561 and 571 can represent the variation of three binary levels, respectively, and therefore, represent a six possible combinations: '000', '100', '110', '111', '011' and '001'. The three output signals are processed into the sequenced signal 721 by the signal processor 71 and then transmitted via the transmission line 72 to the signal restorer 61, which restores them back into the output signal 551, 561 and 571 for use by the controller 6 to maintain normal operation of the motor.

Figure 6:
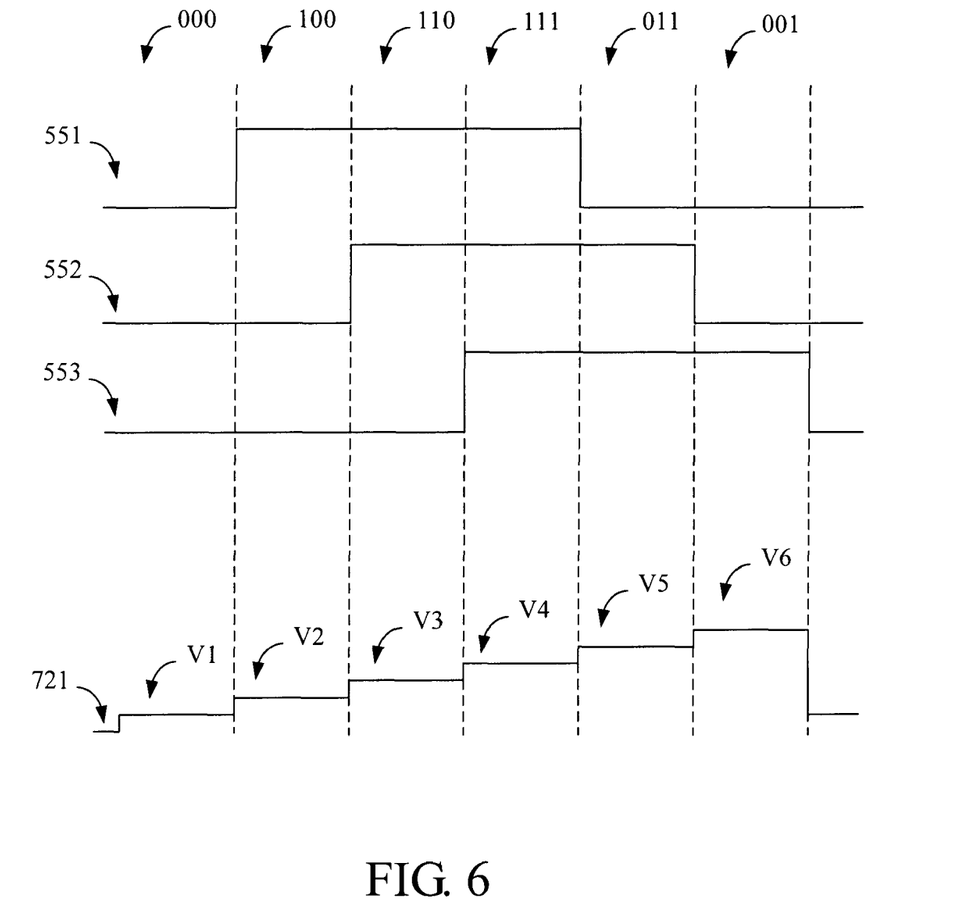
FIG. 6 is a schematic view of waveforms of a sequenced signal in another preferred embodiment.
Figure 7:
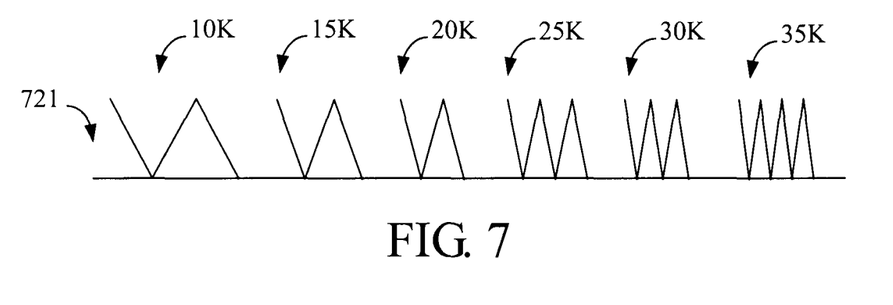
FIG. 7 is a schematic view of the waveforms of a sequenced signal.
Figure 8:
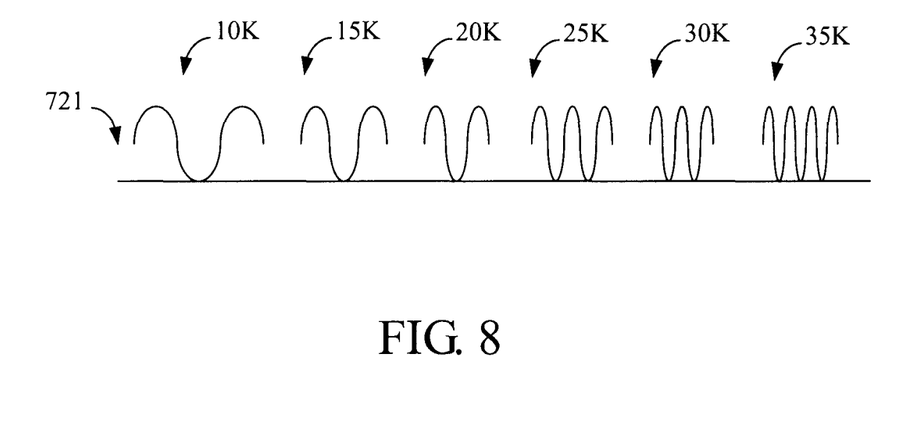
FIG. 8 is a schematic view of the waveforms of another sequenced signal.

Furthermore, as illustrated in FIG. 5, the sequenced signal 721 can comprise a plurality of sub-signals with different frequencies. In this embodiment, the sequenced signal 721 comprises six square-waves, which represent the six different states '000', '100', '110', '111', '011' and '001' respectively with the respective frequencies 10 KHz, 15 KHz, 20 KHz, 25 KHz, 30 KHz and 35 KHz. FIG. 6, is a schematic waveform of a sequenced signal 721 in another embodiment. The sequenced signal 721 can also comprise a plurality of sub-signals, which represent the six different states '000', '100', '110', '111', '011' and '001' respectively with the perspective voltage levels of V1, V2, V3, V4, V5 and V6. Because the present invention relies on phase differences between output signals, this invention is not limited by the precise form and number of the output signals and sequenced signal. In other embodiments, the output signals and the sequenced signal may be in other forms. For example, sub-signals of the sequenced signal may also be the sine-wave or triangle-wave signals as shown in FIGS. 7 and 8.

In this embodiment, the processed output signals 551, 561 and 571 are transmitted through the transmission line 72, and can be restored upon reception by the signal restorer 61, so that the controller 6 can adjust the power signals 612, 613 and 614 outputted to the excitation coils 52, 53 and 54 based on the restored output signals 551, 561 and 571, thereby, controlling the operation of the DC brushless motor 5.

In the above embodiment, the controller 6 can be arranged at any appropriate location. For example, the controller 6 can be arranged inside the housing, such as a bell-shaped housing, at the interface between the ceiling fan 1 and the ceiling.

It should be emphasized that the output signals 551, 561 and 571 in this invention are transmitted collectively through a single transmission line 72, and therefore no additional transmission lines are required for transmitting the output signals of the sensors.

It should be appreciated from the above descriptions that, this invention can be used in a DC brushless motor of a ceiling fan to transmit output signals of sensors via a single transmission line in a processing-and-restoring way to reduce the number of transmission lines used and eliminate the need of excessively large holes in the motor axis. As a result the axis endurance is maintained and prolongs the service life of the motor, and reducing the replacement cost and time.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A signal transmission apparatus of a DC brushless motor for a ceiling fan, being electrically connected to the DC brushless motor of the ceiling fan and a controller, the DC brushless motor comprising a plurality of magnetic poles and at least one sensor, the controller comprising a signal restorer, the signal transmission apparatus comprising:

a transmission line;

a reference level line for providing a reference voltage level; and a signal processor;

wherein each of the at least one sensor is configured to sense variation of operation of the magnetic poles of the DC brushless motor, and generate at least one output signal, the signal processor configured to receive and process the at least one output signal into a sequenced signal, the sequenced signal in which the at least one output signal is being transmitted to the controller via the transmission line, the signal restorer configured to receive and restore the sequenced signal to the at least one output signal, and the controller configured to control the DC brushless motor to operate according to the restored at least one output signal.

2. The signal transmission apparatus as claimed in claim 1, wherein the DC brushless motor further comprises a plurality of excitation coils, the controller further comprises a plurality of coil-energizing lines being connected to the coils respectively, the controller generates a plurality of energy signals according to the restored at least one output signal, and transmits the energy signals to the coils via the coil-energizing lines to control the operation of the DC brushless motor.

3. The signal transmission apparatus as claimed in claim 1, wherein the number of the at least one output signal is plural, and the output signals have phase differences between each other.

4. The signal transmission apparatus as claimed in claim 3, wherein each of the output signals is a square-wave signal.

5. The signal transmission apparatus as claimed in claim 3, wherein the signal processor processes the output signals according to the phase differences between the output signals, in which the processor processes the output signals into the sequenced signal.

6. The signal transmission apparatus as claimed in claim 5, wherein the sequenced signal comprises a plurality of sub-signals with different frequencies respectively.

7. The signal transmission apparatus as claimed in claim 6, wherein each of the sub-signals is a square-wave signal.

8. The signal transmission apparatus as claimed in claim 6, wherein each of the sub-signals is a triangle-wave signal.

9. The signal transmission apparatus as claimed in claim 6, wherein each of the sub-signals is a sine-wave signal.

10. The signal transmission apparatus as claimed in claim 5, wherein the sequenced signal comprises a plurality of sub-signals with different voltage levels respectively.

11. The signal transmission apparatus as claimed in claim 1, wherein each of the at least one sensors is one of a Hall sensor and an infrared rays breaker.

12. The signal transmission apparatus as claimed in claim 1, wherein the ceiling fan comprises a housing being configured to contain the controller.

\* \* \* \* \*